2 Sheets--Sheet 2.
W. BRAY.
Ice-Machines.
No. 145,838.                                            Patented Dec. 23, 1873.
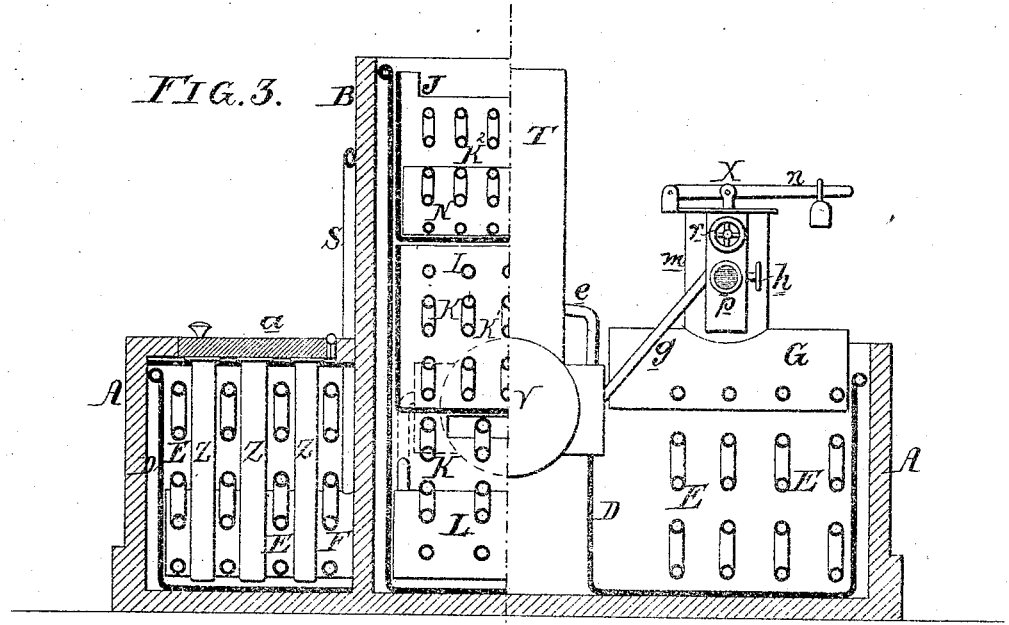
Witnesses, John K. Rupertus.          Wilson Bray
Harry Smith                          by his Attys.
                                          Howson and Son.

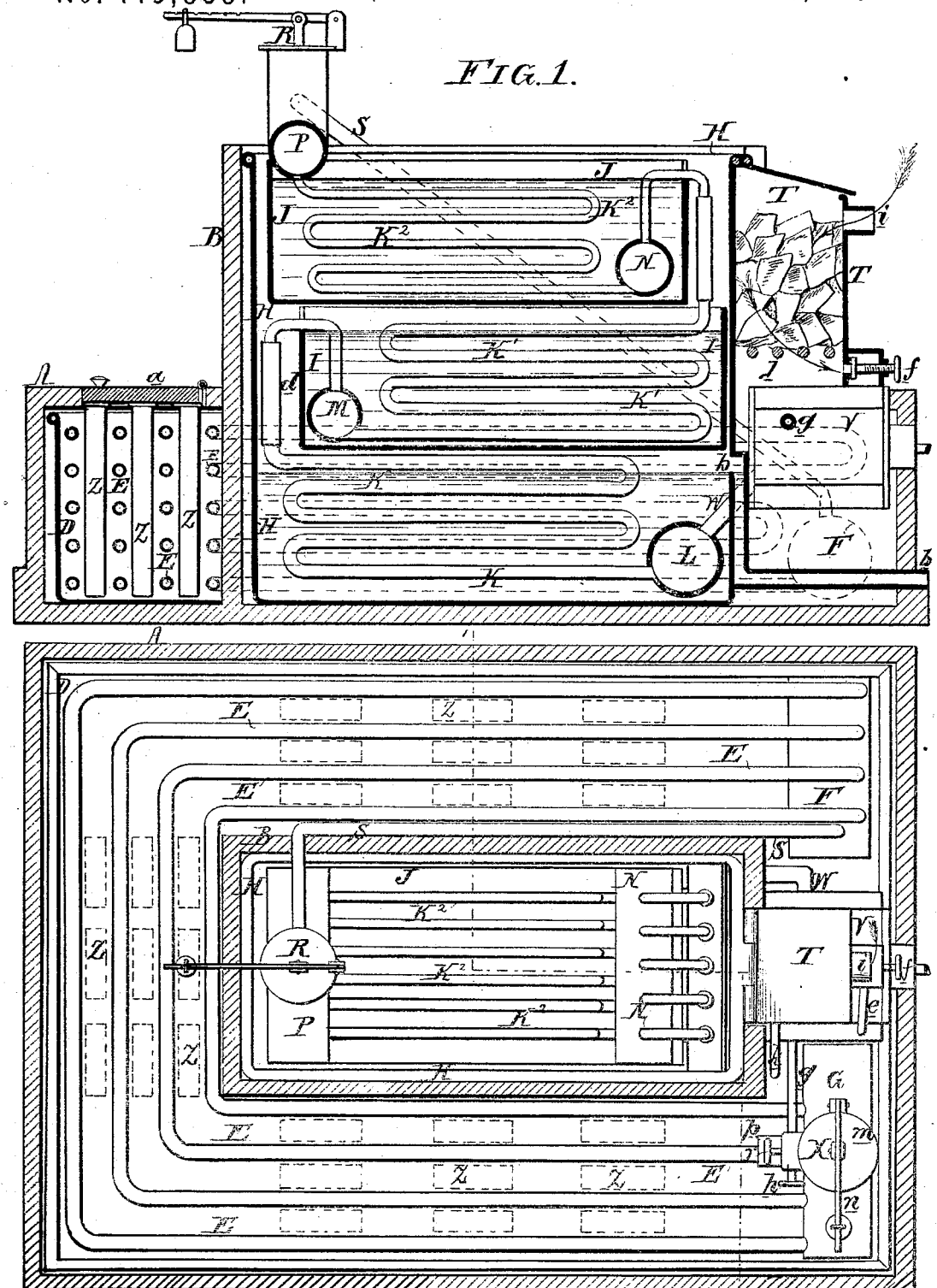

UNITED STATES PATENT OFFICE.

WILSON BRAY, OF LAMBERTVILLE, NEW JERSEY.

IMPROVEMENT IN ICE-MACHINES.

Specification forming part of Letters Patent No. 145,838, dated December 23, 1873; application filed October 22, 1873.

*To all whom it may concern:*

Be it known that I, WILSON BRAY, of Lambertville, Hunterdon county, New Jersey, have invented an Improved Ice-Making and Refrigerating Apparatus, of which the following is a specification:

My invention relates to that class of ice-machines in which air is cooled after being compressed, and is then liberated, so that in expanding it shall absorb heat from a surrounding body or from the atmosphere; the object of my invention being either to produce ice or to create and maintain a low temperature in a room or refrigerating-chamber more readily and economically than heretofore, by the apparatus illustrated in the sectional elevation, Figure 1, sectional plan, Fig. 2, and transverse section, Fig. 3, (on the line 1 2, Fig. 2,) of the accompanying drawing, the principle of operation of the said apparatus being the production of heat by the compression of air, the dissipation or absorption of a great portion of this heat by running water, and the production of a very low temperature by the dilatation or expansion of the cool compressed air into a partial vacuum or the atmosphere.

A represents a large rectangular tank, and B a smaller tank of greater height contained within the said tank A, both being preferably constructed of wood, lined and covered with non-conducting material. Within the tank A is a sheet-metal pan, D, containing a series of coiled pipes, E, each of which is carried several times back and forth around three sides of the tank B, and communicates at one end with a cylindrical vessel, F, at the bottom of the pan, and at its opposite end with a similar vessel, G, at the other side and top of said pan. (See Figs. 1 and 2.) The tank A is closed at the top, but has openings covered by hinged doors $a$ through which access may be obtained to any portion of its interior. The whole interior of the central tank B is occupied by a water-pan, H, open at the top, having an outlet, $b$, at some little distance above the bottom, and containing two shallower pans, I and J, one arranged directly above the other, as best observed in Figs. 1 and 3. Within the pan H is a series of coiled pipes, K, all communicating at their lower ends with a cylinder, L, and at their upper ends through the medium of couplings $d$ and a cylinder, M, with a similar series of coiled pipes, $K^1$, of smaller diameter in the pan I, the said pipes $K^1$ communicating in turn at their upper ends with a third series of coiled pipes, $K^2$, of still smaller diameter, in the pan J. The latter contains two cylinders, N and P, the former of which serves as a medium of communication between the pipes $K^1$ and $K^2$, while the cylinder P, to which the upper ends of the pipes $K^2$ are connected, is surmounted by a casing and weighted valve, R, on raising which communication is established, through an inclined pipe, S, between the said cylinder P and the cylinder F at the bottom of the tank A. At one end of the apparatus, between the tanks A and B, there is an ice-box, T, and a double-acting air-pump, V, the latter communicating directly with the cylinder L at the bottom of the pan H, through a pipe, W, Fig. 1, and drawing its supply of air either from the ice-box, through a pipe, $e$, provided with a cock, $f$, or from the cylinder G, through a pipe, $g$, provided with a cock, $h$. (See Figs. 2 and 3.) The ice-box has an inlet-opening, $i$, for air, a grated bottom, $j$, and a pipe, $k$, through which the drippings are discharged into the tank A. The cylinder G is surmounted by a casing, $m$, containing a valve, X, retained in its seat by a weighted lever, $n$, the arrangement being the same as with the weighted valve R at the top of the apparatus. The valve-casing $m$ has also an outlet, $p$, to the open air, which can be opened or closed by manipulating a cock, $r$. (See Figs. 2 and 3.)

In using the apparatus for the production of ice, the pipes E and cylinder F in the outer tank A are submerged in water in which common salt has been dissolved, and the water to be frozen is contained in deep narrow vessels Z suspended in this liquor between the coiled pipes E, as best observed in Figs. 1 and 3. After placing the vessels Z, the lids $a$ of the tank are closed, so as to exclude the warm outer air. The pans H, I, and J are next filled with cold water, in which the several coils K, $K^1$, and $K^2$, with their connecting-cylinders, are submerged. This water is constantly changed, the supply first entering the upper pan J, and overflowing from the same and the pan I into the lower pan H, whence it is discharged through the outlet b. Communication between the air-pump and the ice-box is next cut off by closing the cock f, the cock r is turned to such a position as to close the outlet p of the casing m, the weighted valve X is raised from its seat and held open by any suitable means, communication is established between the cylinder G and the air-pump by opening the cock h of the pipe g, and the valve R at the top of the apparatus is weighted so as to yield to a pressure of, say, not less than forty-five pounds to the square inch.

After thus preparing and adjusting the several parts of the apparatus the air-pump is set in operation, when the air will be exhausted from the pipes E and cylinders F and G, and forced into the pipes K, K$^1$, and K$^2$ and their connecting-cylinders. The heat produced by the compression of the air in the said pipes K, &c., is rapidly dissipated or absorbed by the running water in the pans H I J, the general direction of the currents of water being downward, while that of the air is upward, the consequence of which is the thorough cooling of the compressed air before it reaches the valve R. This cooling operation is much facilitated by increasing the extent of surface of the upper pipes by reducing their diameters; but the number of said pipes should be increased so that their combined areas may be uniform in the several series, otherwise there would be a retarding of the upward passage of the air. As soon as the pressure of the air in the pipes K exceeds forty-five pounds the valve R will be lifted, and a portion of the compressed air in its cooled condition will pass through the pipe S into the coils E and cylinders F and G, a portion of the compressed air thus escaping at every stroke of the pump when the apparatus is in full operation.

The dilatation or expansion of the cool compressed air into the pipes E, in which as near a perfect vacuum as possible is maintained by the pump, will produce a very low temperature in the said pipes, and the consequence will be the corresponding cooling of the saline liquor in the tank A, and the freezing of the water in the suspended vessels Z, which are removed and replenished from time to time. As the several series of pipes and connecting vessels are entirely closed, and communicate only with each other and the pump, the operation will be continuous and upon the same body of air, so that a low degree of temperature, when once obtained, can be readily maintained.

The operation of freezing is much facilitated by excluding the warm external air from the interior of the tank A, by closing the same at the top, as before described.

When the apparatus is to be used for cooling refrigerating-chambers or the air of apartments, the several cocks are so manipulated as to open communication between the ice-box and the pump, to shut off the latter from the cylinder G, and to open the outlet p, the valve R being also raised and held open while the valve X is lowered into its seat and loaded. The pump will then draw its supply of air from the ice-box, and the air will be forced into and compressed in the whole system of pipes K, K$^1$, K$^2$, and E, and when it reaches the predetermined pressure after being cooled in the said pipes, will lift the valve X at each stroke of the pump and pass off through the outlet p into the room or refrigerating-chamber, cooling the latter by its dilatation.

It should be understood that the inlet-opening i of the ice-box, and the outlet-opening p for the cooled compressed air, should be at opposite ends of the isolated chamber to be cooled.

The apparatus can be constructed at a comparatively slight cost, as ordinary gas-pipe may be used for the coils, and sheet-iron for the water-pans, and, owing to the method of connecting the several series of pipes to cylinders at their opposite ends, a free and uniform circulation is obtained throughout the whole with comparatively few joints, and little risk of leakage.

I claim as my invention—

1. An ice-producing apparatus in which are combined an air-pump, V, and two series of submerged pipes K and E, each communicating directly with the said pump and with each other through a casing or passage in which is arranged a loaded valve, R, all substantially as and for the purpose specified.

2. The combination of the air-pump V and two connected series of submerged pipes, K and E, the former communicating with the pump, and the latter terminating in an outlet provided with a loaded valve, X, all substantially as and for the purposes specified.

3. The arrangement, substantially as described, within the outer tank or freezing-chamber A, and in respect to the central tank B of the vessels F and G, and the coils E.

4. The combination, substantially as described, within the tank B, of the water-pans H, I, and J, and their connected coils K, K$^1$, and K$^2$.

5. The combination of the vessels L, M, N, and P, with the coils K, K$^1$, and K$^2$, substantially as and for the purpose specified.

6. The combination, with the coils K$^2$ and E, of the vessels P and F, the valve R and its casing, and the pipe S, all substantially as specified.

7. The combination of the air-pump V, ice-box T, vessel G, and the pipes e and g, with their cocks, whereby communication may be established between the said pumps and either the ice box or vessel, all substantially as and for the purpose specified.

In testimony whereof I have signed my name to this specification in the presence of two subscribing witnesses.

WILSON BRAY.

Witnesses:
WM. A. STEEL,
HARRY SMITH.